Aug. 12, 1930.  A. ROANO  1,772,688
SINGLE OR DOUBLE HELICAL GEAR WHEEL WITH A PLURALITY OF AXIAL PITCHES
Filed June 4, 1928
Fig. 1.
Fig. 3.
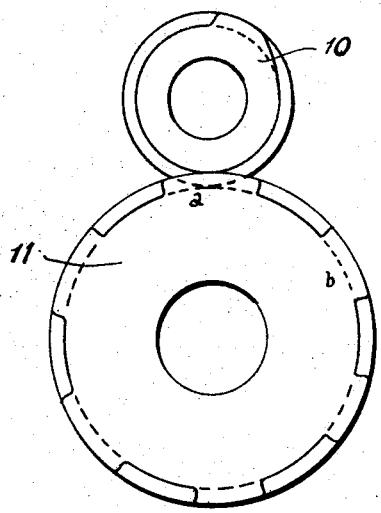
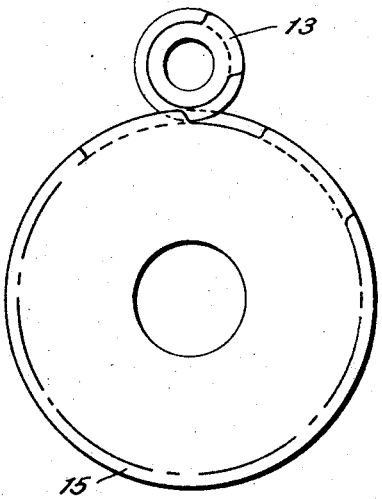
Fig. 2.
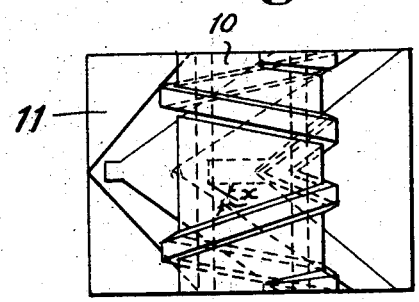
Fig. 4.
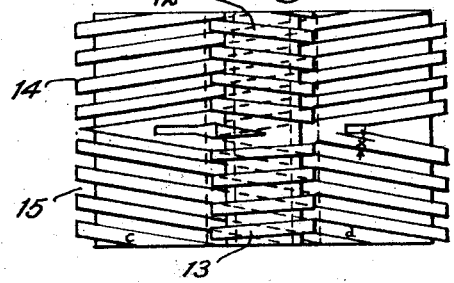
INVENTOR.
Alessandro Roano
BY *Marks & Clerk*
ATTORNEYS.

Patented Aug. 12, 1930

1,772,688

UNITED STATES PATENT OFFICE

ALESSANDRO ROANO, OF NAPLES, ITALY

SINGLE OR DOUBLE HELICAL GEAR WHEEL WITH A PLURALITY OF AXIAL PITCHES

Application filed June 4, 1928, Serial No. 282,870, and in Italy June 30, 1927.

The present invention relates to a pair of transmission wheels for use with parallel shafts or with shafts slightly inclined at an angle to each other essentially characterized by the following features:

Silent action and much improved efficiency for high speeds as compared with previously known rotational mechanisms.

The possibility of obtaining any desired kinematic ratio and the possibility of substituting a simple pair of wheels for a train of gears.

The possibility of reducing considerably the unitary pressure on the teeth.

The possibility of rendering the kinematic ratio independent of the number of the teeth of the two driving and driven elements.

The possibility of obtaining the non-reversibility of the movement with parallel shafts or with shafts as described above.

The possibility of greatly reducing the diameter of the driven wheel, in proportion to the kinematic ratio, and consequently of reducing also the distance between axes and the dimensions of all the corresponding arrangements.

The possibility of being able to construct wheels with teeth of such thickness that they work for as long a time as desired.

For the whole of the long time during which the wheels work, the wear of the teeth not only does not affect the good working of the gear, but it continually corrects still further the faces of the helices which move in contact with each other.

The possibility of being able to transmit high forces with wheels of small diameter as compared with those at present in use.

The principal characteristic of the invention, however, resides in the fact that the inclination of the teeth of the driven gear wheel always differs from the inclination of the teeth of the driving gear wheel or worm.

In addition, the invention presents further minor advantages which will appear in the course of the description.

The invention is illustrated by way of example in the accompanying drawing in which:—

Fig. 1 is an end elevation of a pair of gear wheels;

Fig. 2 is a top plan view of Fig. 1;

Fig. 3 is a similar pair of gears with a higher gear ratio; and

Fig. 4 is a top plan view of Fig. 3.

The constructive idea of these wheels Figs. 1 and 2, is that of a driving element 10, generally formed of a double helix, and of a driven element 11, with as many fractions of double helices as are indicated by the denominator of the fraction forming the desired velocity ratio, having the features hereinafter indicated.

It is evident, however, that the great reduction in the number of the teeth reduces the number of faces of the teeth in and out of engagement for each turn of the wheel, thus reducing shock and damage.

These advantages still remain unaltered when the teeth become worn because, as the driving element is formed of a single double helical tooth, this can only produce exactly because it is a single tooth, an equal wear in each hollow tooth of the driven wheel, in conformity to its shape.

When wear has taken place as described above and as occurs in practice, the measure of the angle at the vertices of the teeth of the driven wheel remains unaltered and the measure of the angle at the vertices of the driving teeth also remains unaltered, but in order for the good working of the pair of gears to remain also unaltered it is necessary for the vertices of the angles of the driven wheel to move gradually and automatically in the direction of the rotation in proportion as the wear of the teeth increases, giving rise to the formation of angles which are always equal to each other and equal to the first ones and with longer sides, because then the point of the driving element does not alter in such a movement, so that the junction of faces of the helices of the two wheels and of the good working of the same remain unaltered in a constant and continuous manner.

The manner in which the above mentioned movement is obtained is described hereinafter.

By increasing the number of double helices of the driving member in order to obtain the same kinematic ratio, it is evidently also necessary to increase proportionately the number of the double helices of the driven element, but, also, such constructions must remain patentable if they are provided with the characteristic features indicated hereinafter.

The helix to the right and the helix to the left of the driving element engage respectively with the left hand helix and the right hand helix of the driven element.

With the object of reducing the unitary pressure upon the teeth, Figs 3 and 4 show a pair of gears in which a number of teeth may be kept continuously in gear which is double the number expressed by the denominator of the fraction forming the velocity ratio. Such a pair is formed by a driving wheel with a single double helix with a plurality of continuous axial threads and a driven wheel with as many double helices, distributed all upon the whole of the periphery, as there are axial threads only right or left on the driving wheel.

The number of the double helices of the driven wheel in Figs. 3 and 4 may be reduced, however, to one only while maintaining unaltered the corresponding driving wheel described above. In this case the kinematic ratio is simply satisfied by the ratio of the number of the axial threads provided upon the two wheels.

The terminal lateral faces of all the wheels described above may be given a greater distance as desired for the purpose of preserving the necessary resisting sections for the helical teeth.

The described rotation mechanism may also be formed by simple helices (assuming that the wheel is cut along the plane normal to the axis and passing through the vertices of the double helices) thus obviating as a natural consequence the disadvantage of axial play.

The degree of inclination of the helices (or the angle formed at the point of the double helix) is arbitrary and may be different in the driven wheel from that in the driving wheel. The equality of the said angles in the two wheels gives the maximum value to the effect of the working surfaces and the movement is reversible, but these may vary from a common value, within the required limits while preserving the possibility of obtaining a drive.

If the external angle of the point of the driving double helices is less than that of the driven double helices the movement will be non-reversible, that is it will be impossible to make the driven wheel work as a driving wheel, obtaining thus with parallel axes that which was obtained with inclined axes, employing for example, a continuous screw and a helical wheel in a determined measure of the angles which the threads form with the corresponding axes.

Further, the diameter of the driven wheel may be much less than that indicated by the velocity ratio, with the great advantage of making it possible to reduce the distance between axes and the dimensions of the whole corresponding arrangement and avoiding axial thrust. The hollow teeth of the driven element may be greater than the space necessary for the exact lodgment of the driving element, so that they do not remain in engagement over the whole of the hollow part.

With the object of guaranteeing for the described rotation arrangement a lengthy duration the following two features are mentioned:

a. The points are truncated for a short distance from their summits in order to prevent any possible shock to the gear.

b. The hollows in the prolongation of the hollow teeth in the inner part of the points permit the driving points to advance so that the thickness of the teeth, with wear, is reduced to the amount X (see the drawing).

For this reason, and with regard to the statements made previously in this connection with regard to the unalterable nature of the proper working of these wheels, the helical teeth which move in contact, become rectified in proportion as the wear progresses, giving an exact and silent drive without shock for the whole length of time for which such wheels last.

For the sake of clearness it is pointed out that the constructive features comprised in the arrangement hereinbefore described are also applicable to the driving element, because they arise in the case when the direction of travel is reversed, and that these have not been shown in the accompanying drawing.

From the above it is obvious that it is possible to construct wheels which will last as long as desired, by increasing the thickness of the wheels, and proportionately the measure of the axial pitch, in addition to the diameters, because such increase increases the thickness of the teeth.

The said new constructions are also applicable to gears with internal teeth which are internal to a circular crown.

Within the limits set for the usual gear wheels, including those with chevrons, the height of the double helical teeth may be considerably reduced (linear reduction of the bending moment) and the thickness increased (quadratic increase of the modulus of resistance) without increasing the diameter.

For this reason it is possible to transmit high efforts with wheels of small diameter.

For use, the distance from the centres of rotation will always have to be less than the sum of the external radii of the helices of the two elements.

The helices of one half wheel may also be displayed circumferentially with respect to the helices of the companion half wheel an amount less than the circular pitch.

Similarly the diameters, or the axial pitches, or the normal and circular pitches of each half wheel as described above may be unsymmetrical with respect to the companion half wheel.

In the normal case of non-reversibility of the movement, the efficiency and the silent nature of the drive are much greater than with all previously known rotation arrangements.

With the described wheels the kinematic ratio is arbitrary and consequently all the rotation mechanism arrangements may be reduced to a simple pair of wheels.

The described wheels may be constructed and employed according to any method already known in the ordinary technique, but such methods are also claimed when they are applied to the new wheels for which the present patent is sought.

For greater clearness it is added that Fig. 1 shows a pair of wheels of which the upper has a double helix and the lower has six.

Fig. 2 shows a view from above and, of the lower wheel, merely for the sake of clearness, only the teeth $a$ and $b$ are shown. If the angles at the vertices were equal the kinematic arrangement would be reversible. In Fig. 2 is seen the difference between the angles and the consequent non-reversibility of the movement.

The recesses and the ribs which eventually engage therein are seen.

The recesses are all made equal to each other although in Fig. 2 they appear different for reasons of perspective.

An example of gearing realized on the principles of my invention is illustrated in the Figures 1 and 2.

For this example a peculiar, characteristic case has been chosen in which one of the wheels 10 is provided with only one spiral tooth while the other wheel 11 is provided with 6 teeth. The ratio of the diameters, as it clearly appears in Fig. 1 showing a side view of the gearing couple, is greater than the ratio of the number of teeth or of the inverse ratio of the number of revolutions, the ratio of the diameters being nearly one half, the ratio of the teeth or inverse of the number of revolutions being one sixth.

This is one of the most important advantages offered by the improvements according to this application. This results in a remarkable reduction of the distance between the axes with a corresponding economy of space and material. The advantage is particularly important in the case of a high ratio of velocity.

The teeth of the wheels illustrated in Figs. 1 and 2 are double, namely, constituted by two elements symmetrically disposed, contacting along the symmetry-plane, the axial thrust occurring in the case of gears with simple teeth being thus neutralized.

Where the two symmetrical parts of the teeth meet the flanks they form a herringbone point both inside and outside the angle, said point resulting in a more extended contact the smaller the inclination of the teeth and flanks of the tooth is. This point has a larger extension than the space left between the teeth of the wheel to be engaged if the second wheel has teeth with a greater inclination. Consquently to obtain motion it is necessary to round the vertex of the herring-bone point on the outside of the angle.

Figs. 3 and 4 also show two wheels with the engagement of eight teeth at the same time for the purpose of distributing the stress.

The recess facilitates final grinding to the minimum thickness $x$ for the resistance of the teeth.

In the accompanying figures it is seen that the inclination of the helices has no demonstration value because the latter, by the laws of the inclined plane, produces known effects applicable in each case.

Characteristic features which do not exist in any previously known rotating arrangement will appear from the preceding description.

In order then to obtain wheels of a long duration and a constant proper functioning of the teeth, inside the angle formed by the two symmetrical elements of the teeeth have been provided to a certain depth limited recesses as shown in Fig. 4 so that the driving points may penetrate therein as the teeth are worn and keep unaltered the contact between the helicoidal elements.

To such an end the two symmetrical halves 12, 13 and 14, 15 of the gearing could be taken apart from one another so as to leave between them a space of any extension. This however would be detrimental to the total space occupied by the whole mechanism.

A gearing of the type described may also be constructed by rotating a half of each wheel a certain angle with respect to the other, so that the origins of the helical lines of one half of the wheel do not coincide with the origins of the helical lines of the other half.

The motion may be equally transmitted when the right and left hand threads of the two wheels have no equal pitch and inclination. In this case, however, height or thickness of both elements of each wheel will be different.

The preceding considerations are applicable not only to a couple, one wheel of which is provided with a single tooth, but also to couples with a ratio of any number of teeth.

The case of the wheel with a single tooth is characteristic both because it is specially adapted for speed reducing gearings and because it possesses the following pecularities.

If the tooth of wheel 10 forms two threads instead of a single one, the continuity of motion is secured even if one of the two teeth of wheel 11 is suppressed, the wheels being of equal height, see Fig. 1.

If the threads are three double-teeth, every third tooth of the wheel 11 may be retained and so on.

The limit is reached when the tooth of wheel 10 forms as many threads as the number of teeth of wheel 11, and then the wheel 11 may in turn have a single tooth, which in this case forms a complete thread, the ratio of the velocities being always the same. In the example of Figs. 1 and 2 this would take place when the tooth of wheel 10 had six threads.

And if, in the case of the wheel 10 having a number of threads greater than one, all the teeth of 11 are retained, the strain is divided on as many teeth, as are formed by the threads of wheel 10 and therefore the strains to be transmitted being the same, the size of the teeth may be reduced, and the profile being the same, greater strains may be transmitted than in the case of a single thread.

In all the helicoidal gearings with teeth of different inclination there will be a sliding between the surfaces in contact, namely between the flanks of the teeth.

The rate of sliding may be varied according to the relative inclination of the teeth, and the resistances due to attrition in consequence of the strains to be transmitted may be contained between the limits of an allowable efficiency.

A sliding of such kind also exists between the flanks in contact of teeth belonging to common gearings and other mechanisms as wheels with helicoidal teeth between oblique axes as an endless screw coupled with the helicoidal wheel though said mechanisms are not much used in practice.

The kinematic ratio may be made independent of the diameters and of the number of the teeth. A good engagement is guaranteed simply by the extension of the co-operating surfaces.

The height of the teeth is independent of the normal pitch.

The diameters may be reduced to a value much lower than is usual, with the enormous advantage of making it possible to approach the axes concerned and reduce the dimensions of the whole of the corresponding arrangement.

In addition when there is sliding, when the angles are unequal (non-reversible couple), the obvious advantage is obtained over worm and worm wheel couples that orthogonal axes are necessary.

In conclusion the profile of the teeth does not possess the characteristics of the teeth of common gearings, nor is the height of the tooth according to application limited in any way by the pitch. The extension of the line of contact must be such that, owing to the strains to be transmitted, the specific pressure results which is most suitable for the material used in the construction of the wheels. The thickness of the tooth is of course fixed by calculations relating to the resistance of materials.

Generally speaking the profile of said teeth are trapezoidal shaped, and the height of the tooth may be kept small with respect to the thickness which is not allowed in common gears in which the height is greater than the thickness. This is a favorable condition both with regard to the strains to be transmitted, the moment of resistance being greater, and to the deterioration. In fact, it is possible to construct teeth of such a thickness that a long time will elapse before they are completely worn out, namely, not before it reaches the limit of resistance beyond which a good functioning is no longer possible.

Having now particularly described and ascertained the nature of my said invention and in what manner the same is to be performed, I declare that what I claim is:

1. In a transmission comprising driving and driven gear wheels the arrangement of double helical teeth in which the driving wheel has one single double helical tooth distributed over the whole of its periphery and the inclination of the teeth of the driven wheel differs from that of the driving wheel.

2. Gear wheels according to claim 1, in which the driven wheel has as many fractions of double helical teeth distributed over the periphery as are indicated by the denominator of the fraction forming the desired velocity ratio.

3. Gear wheels according to claim 1 in which the driving pinion is formed of double helices composed of an arbitrary number of continuous axial pitches.

4. Gear wheels according to claim 1 in which the driven wheel has a number of double helical teeth distributed over the whole of its periphery, corresponding to the denominator of the fraction forming the desired velocity ratio.

5. A pair of gear wheels according to claim 1, having substantially parallel axes, the difference of inclination of the respective helices in combination with the slope of the tooth side of each wheel being such that the wheels become non-reversible.

In testimony whereof, ALESSANDRO ROANO has signed his name to this specification this 11th day of May, 1928.

ALESSANDRO ROANO.